Patented Oct. 27, 1931

1,828,960

UNITED STATES PATENT OFFICE

TENNEY L. DAVIS AND ERNEST H. HUNTRESS, OF CAMBRIDGE, MASSACHUSETTS, ASSIGNORS TO SWANN RESEARCH, INC., A CORPORATION OF ALABAMA

PROCESS FOR THE PREPARATION OF DIAZONIUM PERCHLORATES OF AMINODIPHENYL

No Drawing. Application filed January 27, 1930. Serial No. 423,879.

This invention relates to a process for preparing diazonium perchlorates of the diphenyl series.

Herz, U. S. Patent No. 1,054,411, issued February 25, 1913, proposes a detonating cap containing a diazonium perchlorate of an aromatic or of a nitrated aromatic hydrocarbon. Herz describes diazonium derivatives of benzol, toluol, xylol and also nitro-derivatives of these compounds as suitable filling material for detonators of this type.

We have discovered a method by which diazonium salts may readily be made from diphenyl and nitrodiphenyl derivatives, which salts have an explosive force comparable with those prepared from benzol or allied derivatives. It is accordingly the principal object of our invention to provide a process whereby such diazonium perchlorates of the diphenyl series may be easily and economically produced.

Our procedure is illustrated by the following example:

Diazotize 2, 2′ dinitrobenzidine by adding sodium nitrite to a cold hydrochloric acid solution of the base, in the usual manner. Filter if necessary. Now add to the clear solution an equivalent amount of a solution of ammonium perchlorate. A bright, orange-colored precipitate is immediately formed which may be filtered, washed with water, alcohol and ether, and then dried. It will be found that the dried material is very sensitive to the slightest shock, exploding violently when touched or when warmed. The material is somewhat less sensitive when wet.

In the same manner, diazonium perchlorates may be made from the 2-aminodiphenyl, the 4-aminodiphenyl and the 4, 4′ diaminodiphenyl and other diaminodiphenyls. The diazotization of the amino compound may take place in perchloric acid, in which case the perchlorate of the diazo compound is precipitated as soon as formed. However, we prefer to carry out the diazotization in the presence of hydrochloric acid as described, which then enables one to filter the solution before the ammonium perchlorate is added, thus removing possible impurities. We then precipitate the perchlorate by the addition of ammonium perchlorate to the hydrochloric acid solution as described.

What we claim is:

1. The process of producing a diazonium perchlorate of a diphenyl derivative comprising diazotizing an amino-derivative of diphenyl, reacting the diazotized diphenyl in acid solution with perchloric acids, and removing the precipitated diazonium perchlorate from solution.

2. The process of producing diazonium perchlorate of a nitrated diphenyl derivative, comprising diazotizing an amino-derivative of a nitrodiphenyl, reacting the diazotized diphenyl in acid solution with perchloric acid, and removing the precipitated diazonium perchlorate from solution.

3. A compound having the general formula: $R.N_2.ClO_4$, in which R may be either diphenyl, a nitro-derivative of diphenyl or a nitroamino derivative of diphenyl.

In testimony whereof we affix our signatures.

TENNEY L. DAVIS.
ERNEST H. HUNTRESS.